United States Patent [19]
Den Dopper

[11] Patent Number: 6,039,236
[45] Date of Patent: *Mar. 21, 2000

[54] REFLOW SOLDERING APPARATUS WITH IMPROVED COOLING

[75] Inventor: Rolf A. Den Dopper, Roosendaal, Netherlands

[73] Assignee: Soltec B.V., Netherlands

[ * ] Notice: This patent issued on a continued prosecution application filed under 37 CFR 1.53(d), and is subject to the twenty year patent term provisions of 35 U.S.C. 154(a)(2).

[21] Appl. No.: 08/872,922

[22] Filed: Jun. 11, 1997

[51] Int. Cl.⁷ .............................. B23K 1/00; B23K 31/02; B23K 35/38; F27D 15/02
[52] U.S. Cl. .................... 228/46; 228/222; 228/233.2; 228/234.1; 432/85
[58] Field of Search .................. 228/282, 46; 278/234.2, 278/234.1, 233.2; 432/48, 77, 81

[56] References Cited

U.S. PATENT DOCUMENTS

| | | | |
|---|---|---|---|
| 3,756,489 | 9/1973 | Chartet | 228/43 |
| 3,904,102 | 9/1975 | Chu et al. | 228/180.1 |
| 4,238,186 | 12/1980 | Pfahl, Jr. | 432/10 |
| 4,294,395 | 10/1981 | Nayar | 228/220 |
| 4,519,854 | 5/1985 | Nakanishi et al. | 148/528 |
| 4,565,917 | 1/1986 | Furtek | 219/388 |
| 4,915,624 | 4/1990 | Mittelstadt | 432/59 |
| 4,997,364 | 3/1991 | McGrath et al. | 432/59 |
| 5,051,339 | 9/1991 | Friedrich et al. | 430/311 |
| 5,141,147 | 8/1992 | Yokota | 228/219 |
| 5,147,083 | 9/1992 | Halstead et al. | 228/42 |
| 5,232,145 | 8/1993 | Alley et al. | 228/102 |
| 5,242,096 | 9/1993 | Tsunabuchi et al. | 228/9 |
| 5,259,545 | 11/1993 | Huang | 228/46 |
| 5,356,066 | 10/1994 | Yamada | 228/8 |
| 5,373,893 | 12/1994 | Eisenmann et al. | 165/65 |
| 5,397,997 | 3/1995 | Tuckerman et al. | 324/754 |
| 5,405,074 | 4/1995 | Dopper et al. | 228/42 |
| 5,433,368 | 7/1995 | Spigarelli | 228/8 |
| 5,440,101 | 8/1995 | Cox et al. | 219/388 |
| 5,705,850 | 1/1998 | Ashiwake et al. | 257/714 |
| 5,722,869 | 3/1998 | Raber et al. | 445/3 |

FOREIGN PATENT DOCUMENTS 9201370  2/1994  Netherlands .

OTHER PUBLICATIONS

"Improving Vapor Control. . ." Western Electric, Technical Digest, No. 69, pp. 15–16, Jan. 1983.

*Primary Examiner*—Patrick Ryan
*Assistant Examiner*—Hiley Stoner
*Attorney, Agent, or Firm*—Banner & Witcoff, Ltd.

[57] ABSTRACT

A reflow soldering apparatus includes a plurality of heating compartments connected in series for heating objects for soldering; transporting means for successively carrying the objects through the compartments; and at least first and second cooling compartments connected subsequent to the heating compartments for cooling the soldered objects. The first cooling compartment subjects the objects to a first, descending temperature gradient, and the second cooling compartment subjects the objects to a second, descending temperature gradient, wherein the second temperature gradient is steeper than the first temperature gradient. The objects are cooled in the first cooling chamber to a temperature below the solidification temperature of the solder.

8 Claims, 2 Drawing Sheets

REFLOW SOLDERING APPARATUS WITH IMPROVED COOLING

The present invention relates to a reflow soldering apparatus comprising: a plurality of heating compartments connected in series for heating products for soldering; transporting means for successively carrying the products for soldering through the compartments; and at least a first and a second cooling compartment connected subsequent to the heating compartments for cooling the soldered products.

Such reflow soldering apparatus are generally known.

In the reflow process components for soldering for instance onto a printed circuit board are connected conductively to the printed circuit board by means of a paste containing solder. The thus obtained assembly is subsequently carried through the reflow soldering apparatus, wherein the assembly is subjected to an increasing heating in the various compartments. Herein the glue initially evaporates, while the solder then melts and the solder solidifies in the cooling compartment. A solder joint of high quality is thus obtained.

The soldered objects leaving such a reflow soldering apparatus are subjected to a subsequent production process, for instance a test process. It is important for this purpose that the soldered objects are sufficiently cooled. Within a single cooling compartment it is however only possible to obtain a limited cooling. It is pointed out here that in order to obtain a solder joint of a high quality it is desirable that in the first part of the cooling process, i.e. over the temperature range within which the solidifying of the solder occurs, the temperature gradient is not steeper than a determined value. Due to the ex-like progress of the cooling process it will be apparent that, once the solidification temperature of the solder has been reached, the rest of the cooling process will take place with a less steep temperature gradient. This results in an excessively long cooling process, which will either take up an excessive amount of space in a reflow soldering apparatus or will result in a high exit temperature of the soldered components leaving the reflow soldering apparatus.

The object of the present invention is to obviate the above stated problems.

This object is achieved in that the first cooling compartment is adapted to subject the soldered objects to a first descending temperature gradient; the second cooling compartment is adapted to subject the soldered objects to a second descending temperature gradient; and the second temperature gradient is steeper than the first temperature gradient.

As a result of these steps it is possible that after cooling has taken place in the first cooling compartment to below the solidification temperature of the solder, a further cooling with a steeper temperature gradient takes place in the second cooling compartment; here the cooling has no further influence on the quality of the solder joint.

It is pointed out here that the cooling with oil takes place indirectly, i.e. with interposing of air.

According to a first preferred embodiment at least the first compartment is provided with an oil circuit.

This oil cooling circuit provides the option of carrying out an effective cooling over the temperature range, usually of between 150° C. and 70° C. This is a broad temperature range, so that a strong cooling can take place in the second compartment. The broad temperature range provides the user with a large adjustment range for his process control.

According to a second preferred embodiment the second compartment is also provided with an oil circuit.

Other attractive preferred embodiments are specified in the remaining claims.

The present invention will be elucidated hereinbelow with reference to the annexed drawings, wherein.

Figure 1:
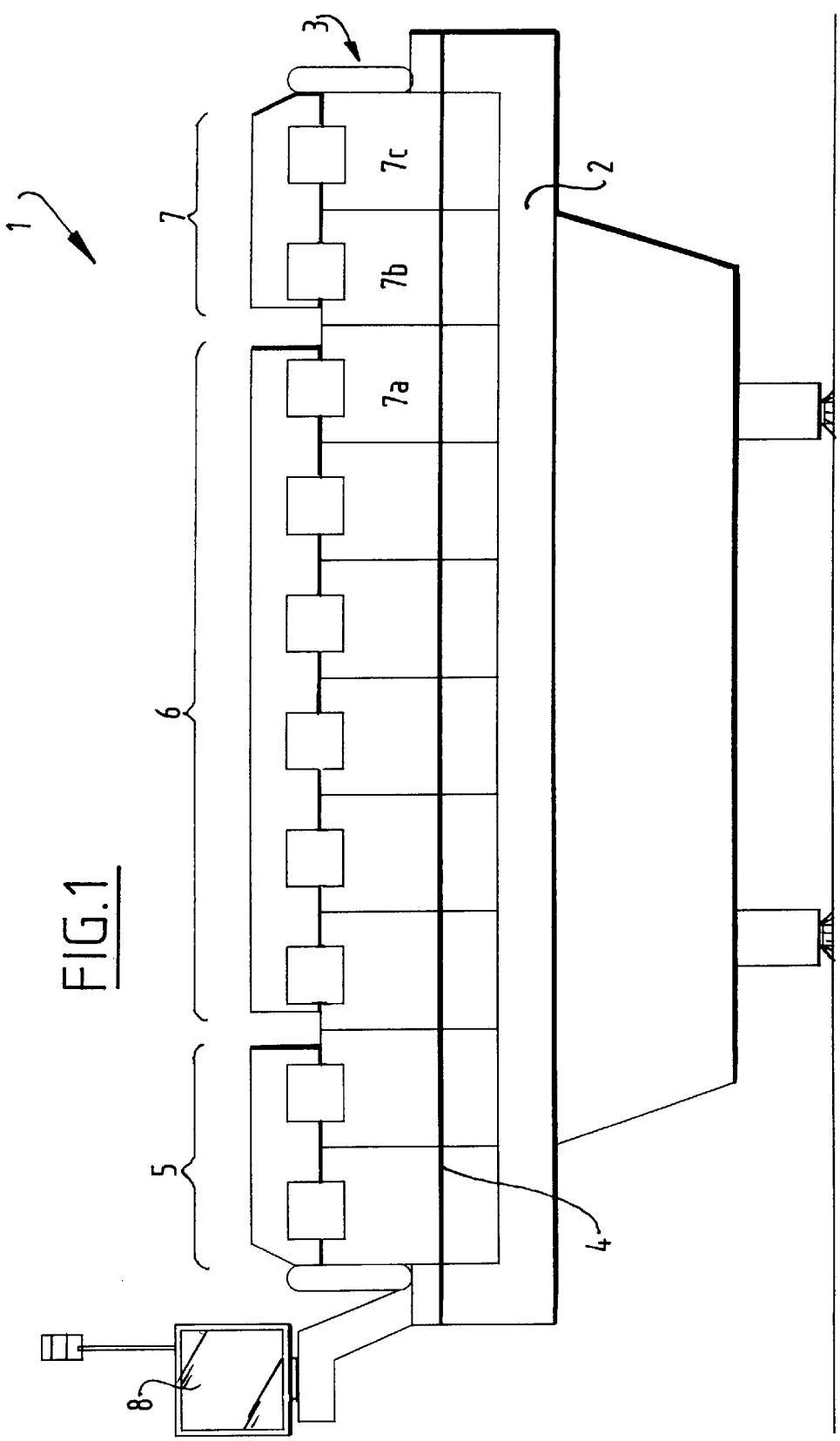
FIG. 1 shows a schematic front view of a reflow soldering apparatus according to the present invention.

Shown in FIG. 1 is a soldering apparatus 1 which is formed by a frame 2, on which are placed the compartments 3. Further arranged is a transporting device designated schematically by a line 4. Compartments 3 can be divided into the pre-heating compartments 5, the actual soldering compartments 6 and the cooling compartments 7. The device is further provided with a computer 8.

Such a device is described in the Netherlands patent application 9201370.

Figure 2:
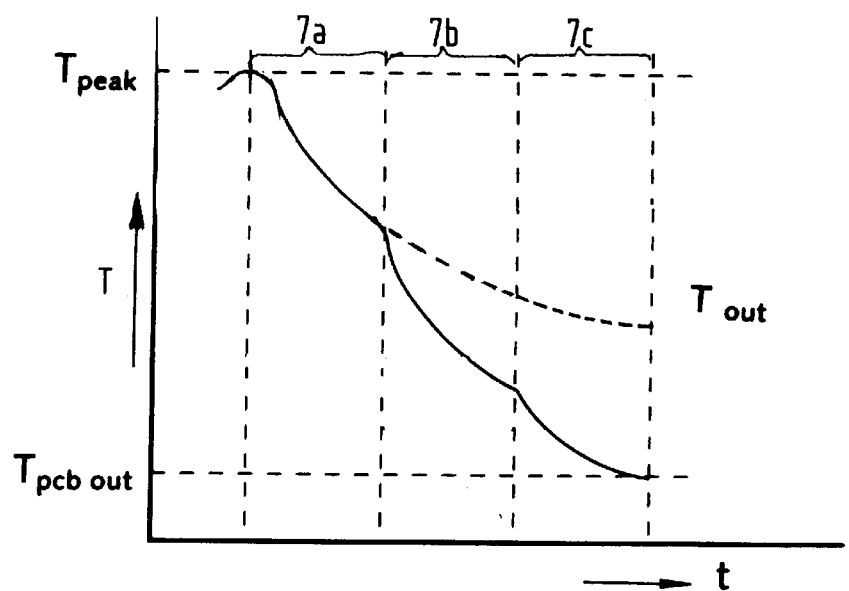
FIG. 2 shows a graph of the temperature curve in the cooling compartments of the reflow soldering apparatus shown in FIG. 1.

It is pointed out here that the objects for soldering, in this case printed circuit boards with components glued thereon, are supplied via transporting device 4 and subjected to a pre-heating process in compartments 5, while in compartments 6 the actual soldering process takes place. Herein the soldered objects leave the compartment 6 furthest to the right at their highest temperature during the process. This temperature is represented in FIG. 2 with $T_{PEAK}$. The soldered objects are subsequently subjected to a cooling process in the three cooling compartments 7A, 7B and 7C.

FIG. 2 shows in particular that the use of a single cooling compartment, the initial gradient of which is determined by the maximum gradient for solidifying the solder, would result in a high exit temperature which is designated in FIG. 2 with $T_{out}$. The temperature curve resulting in this exit temperature is shown with a dotted line. By applying a second cooling zone it is possible to introduce a steeper gradient which, while levelling off later, nevertheless results in a considerably lower exit temperature. This effect is improved even further by applying a third cooling compartment.

The application of the diverse cooling media does of course depend on the physical properties of these media; known from the prior art is the use of air and water as cooling medium in this application. The use of oil is however new. The use of oil as cooling medium is of course known in combustion engines, wherein the oil of course has primarily a lubricating function, but also a cooling function, although this is a field of application far removed from the present use.

It is pointed out here that oil has a much wider temperature range than for instance water; the temperature of water as cooling medium is after all limited at the upper end to its boiling point.

For high temperatures it is found to be attractive according to the prior art to make use of air; it is however also possible to make use of oil cooling for these higher temperatures.

Cooling with air has limitations at the lower end of the temperature range. This limitation is caused by the fact that the temperature of the ambient air usually lies around 20° C.–30° C. Air also has too small a heat capacity, whereby too large a quantity is required for effective cooling.

This oil and air may be used together in a combined cooling circuit.

Figure 3:
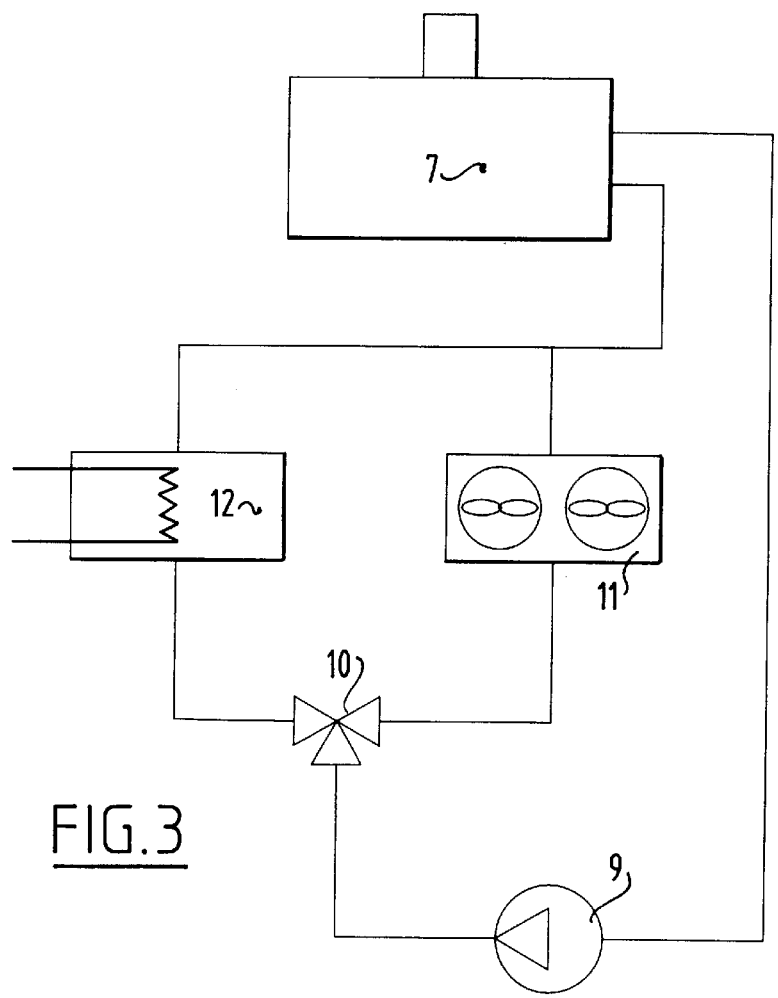
FIG. 3 shows a diagram of a cooling circuit for use in the apparatus shown in FIG. 1.

FIG. 3 shows an example of such a cooling circuit. The compartment 7A is herein taken as example of the use of an oil cooling. The oil from this compartment, which is heated by cooling objects is fed via a pump 9 to a three-way valve 10. The three-way valve 10 leads on one side to a radiator 11 for cooling the heated oil. Cooling takes place for example with ambient air, although it is equally possible to make use of other cooling media for this purpose. The other outlet connection of three-way valve 10 leads to a heating device 12 where, if this is required by the process, the oil will be heated. The conduit from heating device 12 or cooling radiator 11 leads to cooling compartment 7. Here the oil is used to cool the supplied air/gas which provides the cooling of the printed circuit boards. The cooling device is the same as a heating device described in the Netherlands patent application 9201370, FIG. 3, with the understanding that instead of a heating element 31 an oil-cooled cooling radiator is provided.

In the present example there is also, as shown in FIG. 2, a final cooling circuit 7C. Use can be made herefor of a so-called chiller.

I claim:

1. Reflow soldering apparatus for the preparation of printed circuit boards comprising:

a plurality of heating compartments connected in series for heating printed circuit boards for soldering;

transporting means for successively carrying the printed circuit boards for soldering through the compartments; and at least a first and a second cooling compartment connected subsequent to the heating compartments for cooling the soldered printed circuit boards, characterized in that the first cooling compartment has a first cooling circuit through which a first, cooled fluid is circulated, wherein the first cooling compartment is adapted to subject the soldered printed circuit boards to a first descending temperature gradient and wherein the first cooling circuit is an oil circuit;

the second cooling compartment has a second cooling circuit through which a second, cooled fluid is circulated, wherein the second cooling compartment is adapted to subject the soldered printed circuit boards to a second descending temperature gradient; and the second temperature gradient is steeper than the first temperature gradient.

2. Reflow soldering apparatus as claimed in claim 1, characterized in that the second cooling circuit is an oil circuit.

3. Reflow soldering apparatus as claimed in claim 1, characterized in that the oil circuit is cooled by ambient air.

4. Reflow soldering apparatus as claimed in claim 1, characterized in that the oil circuit incorporates an oil temperature conditioning device which comprises:

a three-way valve coupled to a pump;

a cooling device coupled to a first outlet connection of the three-way valve;

a heating device coupled to a second outlet connection of the three-way valve; and a conduit for coupling the cooling device coupled to a first outlet connection of the three-way valve and the heating device coupled to a second outlet connection of the three-way valve.

5. Reflow soldering apparatus as claimed in claim 1, characterized in that the reflow soldering apparatus is provided with a third cooling compartment.

6. Reflow soldering apparatus as claimed in claim 2, characterized in that the oil circuit is cooled by ambient air.

7. Reflow soldering apparatus as claimed in claim 2, characterized in that the oil circuit incorporates an oil temperature conditioning device which comprises:

a three-way valve coupled to a pump;

a cooling device coupled to a first outlet connection of the three-way valve;

a heating device coupled to a second outlet connection of the three-way valve; and a conduit for coupling the cooling device coupled to a first outlet connection of the three-way valve and the heating device coupled to a second outlet connection of the three-way valve.

8. Reflow soldering apparatus as claimed in claim 3, characterized in that the oil circuit incorporates an oil temperature conditioning device which comprises:

a three-way valve coupled to a pump;

a cooling device coupled to a first outlet connection of the three-way valve;

a heating device coupled to a second outlet connection of the three-way valve; and a conduit for coupling the cooling device coupled to a first outlet connection of the three-way valve and the heating device coupled to a second outlet connection of the three-way valve.

* * * * *